US 8,161,003 B2

United States Patent
Kavuri

(10) Patent No.: US 8,161,003 B2
(45) Date of Patent: *Apr. 17, 2012

(54) SELECTIVE DATA REPLICATION SYSTEM AND METHOD

(75) Inventor: Srinivas Kavuri, South Plainfield, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/403,159

(22) Filed: Mar. 12, 2009

(65) Prior Publication Data

US 2009/0177719 A1 Jul. 9, 2009

Related U.S. Application Data

(63) Continuation of application No. 11/480,309, filed on Jun. 29, 2006, now abandoned, which is a continuation of application No. 10/303,640, filed on Nov. 25, 2002, now Pat. No. 7,287,047.

(60) Provisional application No. 60/332,549, filed on Nov. 23, 2001.

(51) Int. Cl.
G06F 7/04 (2006.01)
G06F 17/30 (2006.01)
(52) U.S. Cl. ......... 707/626; 707/640; 707/661; 707/662
(58) Field of Classification Search .............. 707/202, 707/203, 204, 999.202, 999.203, 999.204, 707/626, 640, 661, 662

See application file for complete search history.

(56) References Cited

U.S. PATENT DOCUMENTS

| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,212,784 | A | 5/1993 | Sparks |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |

(Continued)

FOREIGN PATENT DOCUMENTS

EP 0259912 3/1988

(Continued)

OTHER PUBLICATIONS

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

(Continued)

*Primary Examiner* — James Trujillo
*Assistant Examiner* — Bruce Moser
(74) *Attorney, Agent, or Firm* — Perkins Coie LLP

(57) ABSTRACT

The invention relates generally to copying electronic data. More particularly, the invention provides a computerized method for identifying, in a first backup data set, a data item satisfying a selection criterion, and copying to a second backup data set at least a portion of the data item.

18 Claims, 8 Drawing Sheets

U.S. PATENT DOCUMENTS

| | | | |
|---|---|---|---|
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,386,545 | A | 1/1995 | Gombos, Jr. et al. |
| 5,410,700 | A | 4/1995 | Fecteau et al. |
| 5,448,718 | A | 9/1995 | Cohn et al. |
| 5,448,724 | A | 9/1995 | Hayashi |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,555,371 | A | 9/1996 | Duyanovich et al. |
| 5,559,957 | A | 9/1996 | Balk |
| 5,608,865 | A | 3/1997 | Midgely et al. |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,165 | A | 7/1998 | Saxon |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,974,563 | A | 10/1999 | Beeler, Jr. |
| 5,983,239 | A | 11/1999 | Cannon |
| 6,021,415 | A | 2/2000 | Cannon et al. |
| 6,026,414 | A | 2/2000 | Anglin |
| 6,052,735 | A | 4/2000 | Ulrich et al. |
| 6,073,128 | A | 6/2000 | Pongracz et al. |
| 6,076,148 | A | 6/2000 | Kedem |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,182,198 | B1 | 1/2001 | Hubis et al. |
| 6,212,512 | B1 | 4/2001 | Barney et al. |
| 6,226,759 | B1 | 5/2001 | Miller et al. |
| 6,260,069 | B1 | 7/2001 | Anglin |
| 6,266,679 | B1 | 7/2001 | Szalwinski et al. |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton et al. |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,487,644 | B1 | 11/2002 | Huebsch et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,629,110 | B2 | 9/2003 | Cane et al. |
| 6,647,399 | B2 | 11/2003 | Zaremba |
| 6,658,526 | B2 | 12/2003 | Nguyen et al. |
| 6,675,177 | B1 | 1/2004 | Webb |
| 6,839,803 | B1 | 1/2005 | Loh et al. |
| 6,892,221 | B2 | 5/2005 | Ricart et al. |
| 6,976,039 | B2 | 12/2005 | Chefalas et al. |
| 7,028,079 | B2 * | 4/2006 | Mastrianni et al. ........... 709/217 |
| 7,287,047 | B2 | 10/2007 | Kavuri |
| 7,290,017 | B1 * | 10/2007 | Wang et al. .......................... 1/1 |
| 2002/0019830 | A1 | 2/2002 | Hamberg et al. |
| 2002/0049883 | A1 | 4/2002 | Schneider et al. |
| 2002/0107877 | A1 | 8/2002 | Whiting et al. |
| 2004/0220980 | A1 | 11/2004 | Forster |
| 2007/0022145 | A1 | 1/2007 | Kavuri |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0910019 | 4/1999 |
| EP | 0981090 | 2/2000 |
| JP | 7073080 A | 3/1995 |
| JP | 8044598 A | 2/1996 |
| JP | 2003531435 | 10/2003 |
| WO | WO-95/13580 | 5/1995 |
| WO | WO-99/12098 | 3/1999 |
| WO | WO-9912098 | 3/1999 |
| WO | WO-01/06368 | 1/2001 |
| WO | WO-0180005 | 10/2001 |

OTHER PUBLICATIONS

Rosenblum et al., "The Design and Implementation of a Log-Structured File System," *Operating Systems Review SIGOPS*, vol. 25, No. 5, New York, US, pp. 1-15 (May 1991).

Arneson, "Mass Storage Archiving in Network Environments," Digest of Papers, Ninth IEEE Symposium on Mass Storage Systems, oct. 31, 1988-Nov. 3, 1988, pp. 45-50, Monterey, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Armstead et al., "Implementation of a Campus-wide Distributed Mass Storage Service: The Dream vs. Reality," *IEEE*, 1995, pp. 190-199.

First Office Action of Japanese Application No. 2003-548086, Mail Date Sep. 9, 2008, 6 pages.

Final Office Action for U.S. Appl. No. 11/480,309, Mail Date Nov. 12, 2008, 16 pages.

Examination Report for European Application No. 02804063, Mail Date Feb. 25, 2010, 4 pages.

Decision of Rejection, Japan Application No. H2003-548086, Mail Date Sep. 8, 2009, 6 pages.

* cited by examiner

| Storage Name | 1st Storage ID | Duration (weeks) | 2nd Storage ID | Duration (weeks) | 3rd Storage ID | Duration (weeks) | ... | Nth Storage ID |
|---|---|---|---|---|---|---|---|---|
| Primary | 001 | 13 | 005 | 26 | 002 | 52 | | 004 |
| Secondary | 005 | 13 | 003 | 13 | 002 | 65 | | 004 |
| Duplicate | 001 | 13 | | | | | | |
| | 005 | 39 | 002 | 26 | | | | 004 |
| Long Term | 005 | 2 | 002 | 12 | | | | 004 |

Fig. 5

SELECTIVE DATA REPLICATION SYSTEM AND METHOD

PRIORITY CLAIM

This is a continuation application of U.S. patent application Ser. No. 11/480,309, filed Jun. 29, 2006 now abandoned, entitled "SELECTIVE DATA REPLICATION SYSTEM AND METHOD" which is a continuation application of U.S. patent application Ser. No. 10/303,640, filed Nov. 25, 2002, now U.S. Pat. No. 7,287,047, entitled "SELECTIVE DATA REPLICATION SYSTEM AND METHOD" which claims priority from U.S. Provisional Patent Application No. 60/332,549, entitled "SELECTIVE DATA REPLICATION SYSTEM AND METHOD", filed Nov. 23, 2001, each of which is herein incorporated by reference in its entirety.

RELATED APPLICATIONS

This application is related to the following pending applications, each of which is hereby incorporated herein by reference in its entirety:

Application Ser. No. 09/610,738, titled MODULAR BACKUP AND RETRIEVAL SYSTEM USED IN CONJUNCTION WITH A STORAGE AREA NETWORK, filed Jul. 6, 2000;

Application Ser. No. 09/609,977, titled MODULAR BACKUP AND RETRIEVAL SYSTEM WITH AN INTEGRATED STORAGE AREA FILING SYSTEM, filed Jul. 5, 2000;

Application Ser. No. 09/354,058, titled HIERARCHICAL BACKUP AND RETRIEVAL SYSTEM, filed Jul. 15, 1999;

Application Ser. No. 09/774,268, titled LOGICAL VIEW AND ACCESS TO PHYSICAL STORAGE IN MODULAR DATA AND STORAGE MANAGEMENT SYSTEM, filed Jan. 30, 2001;

Application Ser. No. 60/411,202, titled COMBINED STREAM AUXILIARY COPY SYSTEM AND METHOD, filed Sep. 16, 2002; and Application Ser. No. 60/416,699, titled SYSTEM AND METHOD FOR PERFORMING STORAGE OPERATIONS USING QUICK RECOVERY VOLUMES, filed Oct. 7, 2002.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to data storage in a computer network and more particularly to selectively copying data in a modular data and storage management system.

In the GALAXY storage management system software manufactured by Comm Vault Systems, Inc. of Oceanport, N.J., storage policies are utilized to direct how data is to be stored. Storage present the user with logical buckets for directing their data storage operations such as backup and retrieval. Each client points to a storage policy that allows the user to define how, where, and the duration for which data should be stored at a higher level of abstraction without having to have intimate knowledge or understanding of the underlying storage architecture and technology. The management details of the storage operations are transparent to the user.

Storage policies are thus a logical concept associated with one or more backup data sets with each backup data set being a self-contained unit of information. Each backup data set may contain data from multiple applications and from multiple clients. Within each backup data set are one or more archives which are discrete chunks or "blobs" of data generally relating to a particular application. For example, one archive might contain log files related to a data store and another archive in the same backup data set might contain the data store itself.

Backup systems often have various levels of storage. A primary backup data set, for example, indicates the default destination of storage operations for a particular set of data that the storage policy relates to and is tied to a practical set of drives. These drives are addressed independently of the library or media agent to which they are attached. The primary backup data set might, for example, contain data that is frequently accessed for a period of one to two weeks after it is stored. A storage administrator might find storing such data on a set of drives with fast access times preferable. On the other hand, such fast drives are expensive and once the data is no longer accessed as frequently, the storage administrator might find it likely to move and copy this data to an auxiliary or secondary backup data set on a less expensive tape library or other device with slower access times. Once the data from the primary backup data set is moved to the auxiliary backup data set, the data can be pruned from the primary backup data set freeing up drive space for new data.

While existing data storage systems provide a capability to copy data from the primary backup data set to auxiliary backup data sets, this copying procedure is a synchronous operation, meaning generally all data from the primary backup data set must be copied to all auxiliary backup data sets. This process is also called synchronous data replication and is inefficient in terms of data management.

A backup data set will likely contain more than one full backup of data relating to a particular application in addition to incremental or differential backups taken between full backups. For example, a storage administrator might specify for a particular backup data set of a storage policy that a full backup occur once per week with incremental backups occurring daily. If the backup data set were retained for a period of two weeks before being pruned, the backup data set would contain a first full backup of data, F1, with incremental backups I1, I2, I3, I4, I5, I6, and a second full backup F2. If each full backup required one tape and each incremental required half a tape, then 5 tapes would be required to store the data of this exemplary primary backup data set. The auxiliary backup data set would also require 5 tapes when data is transferred from primary to auxiliary backup data set.

Thus, even though synchronous data replication allows the flexibility to promote any auxiliary backup data set to be primary backup data set since the auxiliary backup data set is a full copy of the primary backup data set, tape consumption is very high. If for some reason, data cannot be copied to one auxiliary backup data set, tapes from the primary backup data set will not be rotated. Thus, users may want to copy only particular backups as their degree of required granularity changes. One prominent scheme in the field illustrating this principle is called "Grandfather, Father, Son" (GFS), in which each of the three represents a different period of time. For example, the son may represent a weekly degree of granularity, the father may represent a monthly degree of granularity, and the grandfather may represent a yearly degree of granularity.

Many users do not wish to copy all backups from the primary backup data set to all auxiliary backup data sets. Over time, the degree of granularity that users require changes and while recent data might need to be restored from any given point in time, less precision is generally required when restoring older data. Consider an exemplary storage scheme where full backups are taken weekly, incremental backups are taken daily, data is pruned after two weeks, full backups require one tape, and incremental backups require half a tape. A storage administrator in this example might require that data stored in the past month be able to be restored at a level of granularity of one day, meaning the data can be restored from any given day in the past month. At this degree of granularity, the incremental backups would be necessary to restore data. If the backup data set contained a first full backup of data, F1, with incremental backups I1, I2, I3, I4, I5, I6, and a second full backup F2, then F1, I1, I2, I3, I4, I5, I6 would be required. If incremental backup I6 is performed the same time full backup F2 is performed, the tape containing F2 would be unnecessary, since the full backup F2 could be reproduced from F1 and the incremental backups I1-I6. On the other hand, the storage administrator in this example might only require a degree of granularity of one week for data more than one month old thus the incremental backups would not be required and the full backups would suffice. In this case, only the tapes containing the full backups F1 and F2 would be required and the three tapes containing incremental backups I1, I2, I3, I4, I5, I6 would be unnecessary.

Another example is a storage policy with three backup data sets called Wkly, Mnthly, and Yrly with different retention criteria. Wkly backup data set has a retention period of 15 days, Mthly backup data set has a retention period of 6 months, and Yrly backup data set has a retention period of 7 years. Backups in this example are performed every day with a full backup on every Friday to Wkly backup data set. In addition, a full backup is done at the end of each month to Wkly backup data set. Only the full backup at the end of the week will be copied to Mnthly backup data set and only the end of the month full backup will be copied to Yrly backup data set. Under the assumption that every full backup uses 1 tape and incremental backups require ¼ of a tape, Wkly backup data set takes up to 6 tapes with at most 3 full backups and 12 incremental backups. These 6 tapes get recycled all the time. Mnthly backup data set takes 26 tapes that are constantly recycled and Yrly backup data set takes 1 tape per month for 7 years. Thus, 84 total tapes are required and are recycled over a long period of time.

Also, sometimes problems occur with bad tapes or holes in data due to hardware or software problems. In these instances, data from the primary backup data set cannot be pruned unless all data is copied to all auxiliary backup data sets which is a highly time intensive process and also requires a large number of tapes.

There is thus a need for a system which enables selective copying of data from the primary backup data set to auxiliary backup data sets, promotes efficient tape rotation, provides the capability to configure any variant of GFS scheme, and which further allows selective pruning of data from the primary backup data set.

SUMMARY OF THE INVENTION

The present invention addresses, among other things, the problems discussed above with backup data storage in a computer network.

In accordance with some aspects of the present invention, computerized methods are provided for copying electronic data in a first backup data set, the methods comprising identifying, in the first backup data set, a data item satisfying a selection criterion; and copying to a second backup data set at least a portion of the data item. In some embodiments, the data item may comprise a full backup within a primary backup data set of application data, a full backup within an auxiliary backup data set of application data, a data item associated with a data-specific ID, or other data items.

The selection criteria is a property or characteristic of the first data item used by the invention to select the first data item for copying and other purposes. In some embodiments, the selection criterion comprises a time criterion and identifying the data item comprises comparing a time the data item was stored to the time criterion. In some embodiments, the time criterion comprises a day of a week and identifying the data item comprises comparing a day of the week the data item was stored to the day of the week. In some embodiments, the time criterion comprises a day of a month and identifying the data item comprises comparing a day of the month the data item was stored to the day of the month. In some embodiments, the selection criterion comprises a cycle criterion and identifying the data item comprises comparing a number of cycles occurring since the data item was stored to the cycle criterion. In some embodiments, the cycle criterion comprises a number of full backups performed and identifying the data item comprises comparing a number of full backups performed since the data item was stored to the number of full backups.

In some embodiments, data item satisfies the selection criteria are indicated or otherwise marked or flagged. In some embodiments, indicating that the data item satisfies the selection criterion comprises associating, in a data structure, information with the data item indicating that the data item satisfies the selection criterion. In some embodiments, indicating that the data item satisfies the selection criterion comprises associating, in a matrix, information with the data item indicating that the data item satisfies the selection criterion. In some embodiments, the data item indicated is de-indicated after the data item is copied to the second backup data set. In some embodiments, the data item is de-indicated by removing, in a data structure, information associated with the data item indicating that the data item satisfies the selection criterion. In some embodiments, the data item is de-indicated by removing, in a matrix, information associated with the data item indicating that the data item satisfies the selection criterion. In some embodiments, the data item indicated will not be pruned by a pruning program unless the data item is first de-indicated.

In some embodiments, wherein the data item comprises a full backup of application data.

In some embodiments, copying at least a portion of the data item comprises performing an auxiliary copy of at least a portion of the data item. In some embodiments, the copying of at least a portion of the data item is a restart-able operation.

In one embodiment, the invention provides a system for copying electronic data, the system comprising a first backup data set containing one or more data items; a second backup data set; and a computer, connectable to the first backup data set and the second backup data set; wherein the computer is programmed to identify, in the first backup data set, a first data item satisfying a selection criteria; and to copy at least a portion of the first data item from the first backup data set to the second backup data set.

In one embodiment, the invention provides a computer usable medium storing program code which, when executed on a computerized device, causes the computerized device to execute a computerized method for copying electronic data stored in a first backup data set, the method comprising identifying, in the first backup data set, a data item satisfying a selection criterion; and copying to a second backup data set at least a portion of the data item.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5 is a block diagram of exemplary storage sequences according to an embodiment of the invention;

DETAILED DESCRIPTION

Figure 1:
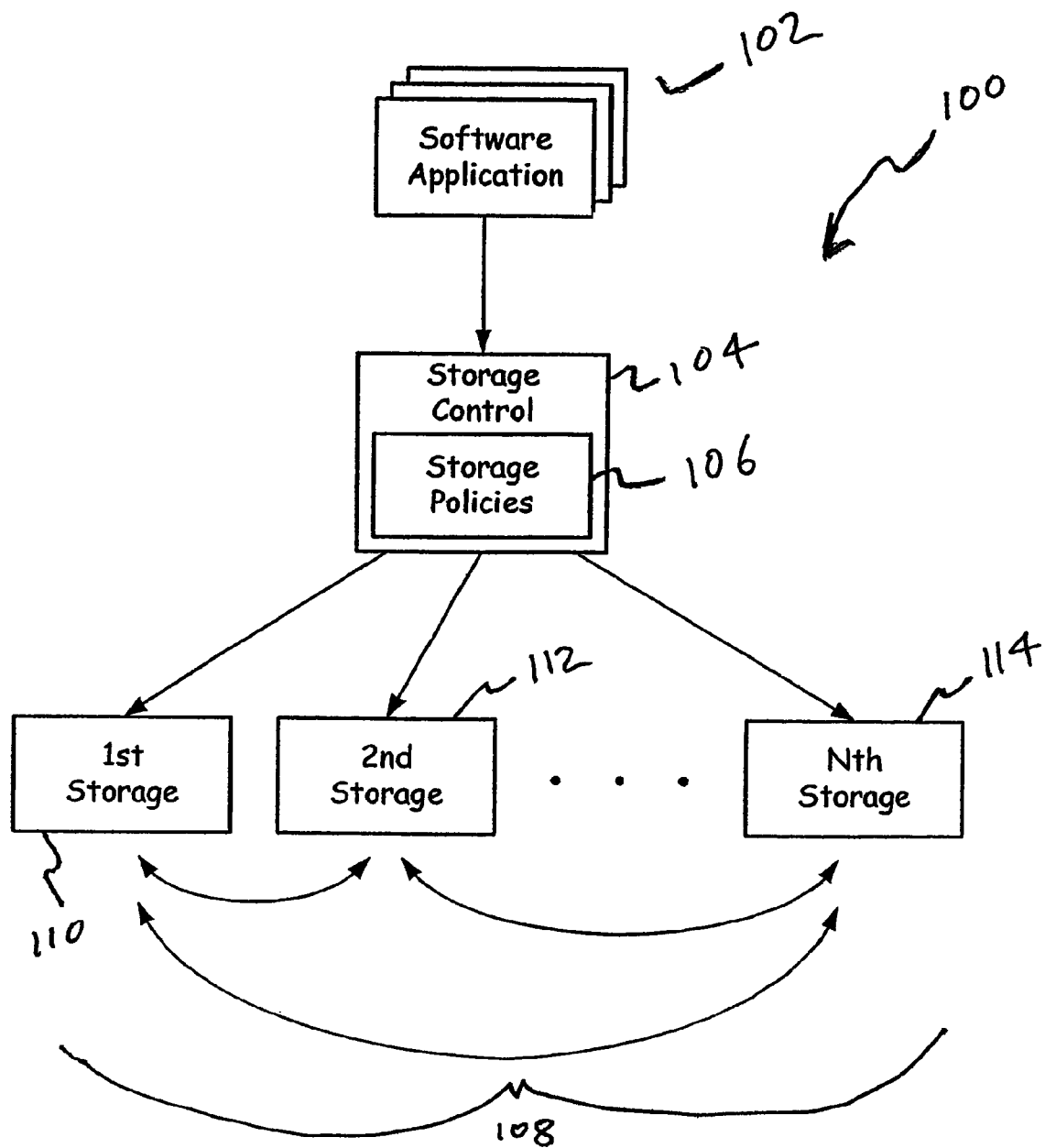
FIG. 1 is a block diagram of an exemplary storage system according to an embodiment of the present invention.

Preferred embodiments of the invention are now described with reference to the drawings. As described further below, preferences associated with data-specific storage policies are used to perform selective data replication. FIG. 1 presents a block diagram of an exemplary storage system 100 according to an embodiment of the present invention. The storage system 100 includes software applications 102 that store data to various storage media 108. The software applications 102 communicate with a storage control 104 that determines where to store data from the software applications 102 according to storage policies 106 as further described herein. The storage control 104 typically receives data that is to be stored from the software applications 102, however, those skilled in the art will recognize that the data is not limited to being received from software applications and the data could also comprise raw data and other types of data known in the art. Upon receipt of data, the storage control 104 determines whether to store the data in storage media 108, such as first storage media 110, a second storage media 112, or any number of other storage media down to an Nth storage media 114. The storage control 104 controls in which storage media 108 the data will be stored, as well as where data that has been previously stored will be moved.

For example, the storage control 104 may move data that has been stored in the first storage media 110 into the second storage media 112 based on certain storage policies 106. In addition, the storage control 104 could move data from the second storage media 112 to any other of the storage media 108 including the Nth storage media 114. Also, the storage control 104 could move data from the first storage media 110 to the Nth storage media 114. Of course, the data could be moved in either direction, and the storage control 104 is capable of moving data generally between storage media 108.

Figure 2:
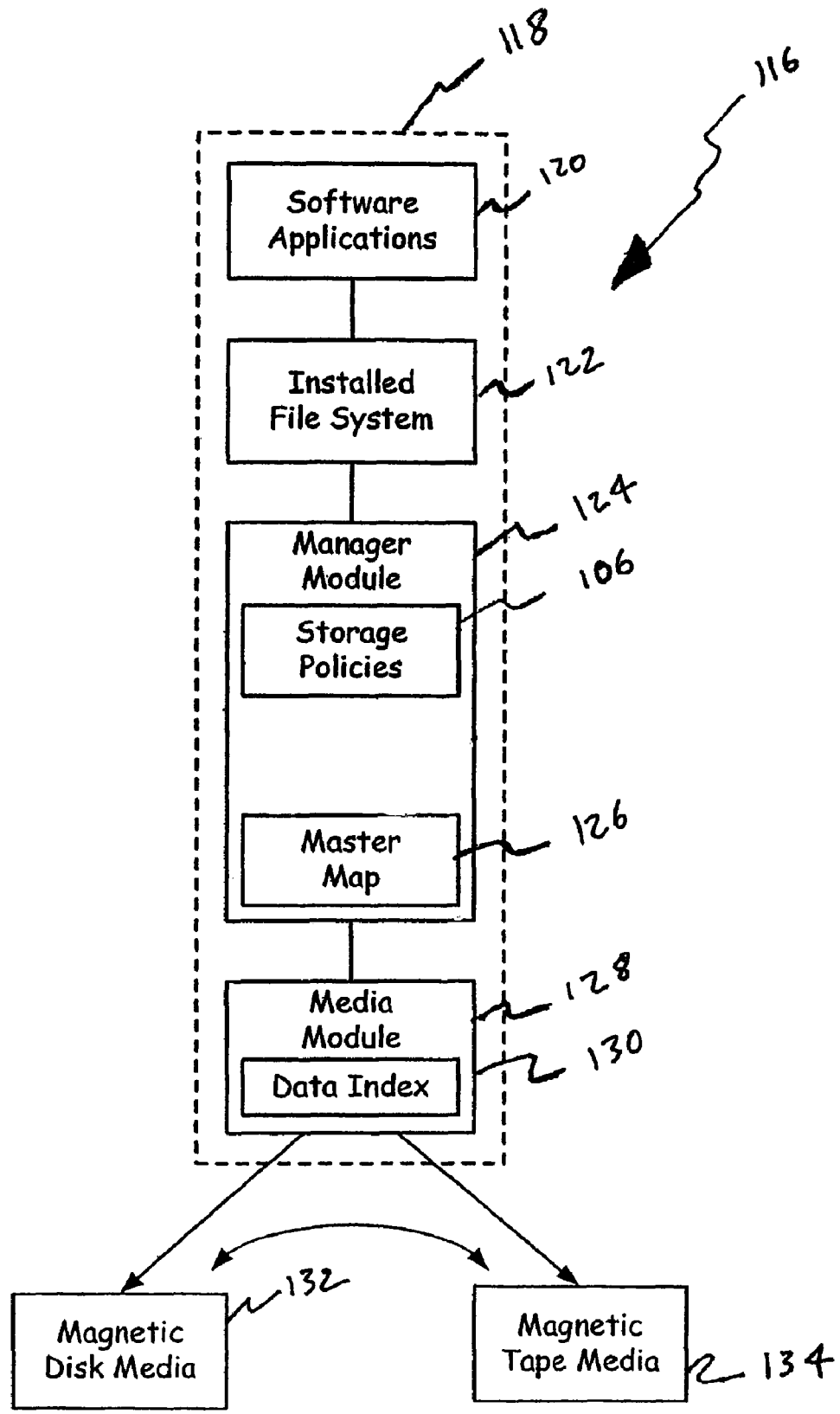
FIG. 2 is a block diagram of another exemplary storage system according to an embodiment of the invention.

FIG. 2 is a block diagram of another exemplary storage system 116 according to an embodiment of the invention. The storage system 116 includes a computing device 118 to carry out operations of the storage system 116. The computing device 118 includes a software application 120 that interacts with an installed file system 122 when data is transferred from the software application 120 to the storage media 108. For example, when a user saves data from the software application 120, the user is only aware that the data is being saved to the installed file system 122. The installed file system 122 interacts with a manager module 124, which in turn interacts with a media module 128 to store data in the storage media 108, however, this process is generally transparent to the user and performed automatically as further described herein.

The manager module 124 is an exemplary storage control 104, and includes storage policies 106 which are used to determine how data that the manager module 124 receives from the installed file system 122 will be stored in the storage media. The manager module 124 also includes a data structure called a master map 126 to assist in initial storage decisions in the storage media. In some embodiments, when the software application is directed to stored data, the data is sent to the installed file system, and then the manager module 124 accesses the storage policies 106 to determine the appropriate location for storage of the data. The master map 126 includes further information for directing the data to be sent to other devices, for example to the other computing devices further processing or to various storage devices 108.

A media module 128 is a hardware or software module that includes a data index 130 that provides further details of where the data is to be stored in the storage system 116. The data index 130 includes details such as the location of storage media 108, such as magnetic disc media 132 and magnetic tape media 134. The data index 130 is updated with file location information when any data is moved from one storage media 108 to another such as from the magnetic disc media 132 to the magnetic tape unit 134. Of course, additional types and more than one type of storage media 108 could be incorporated into the storage system 116.

Figure 3:
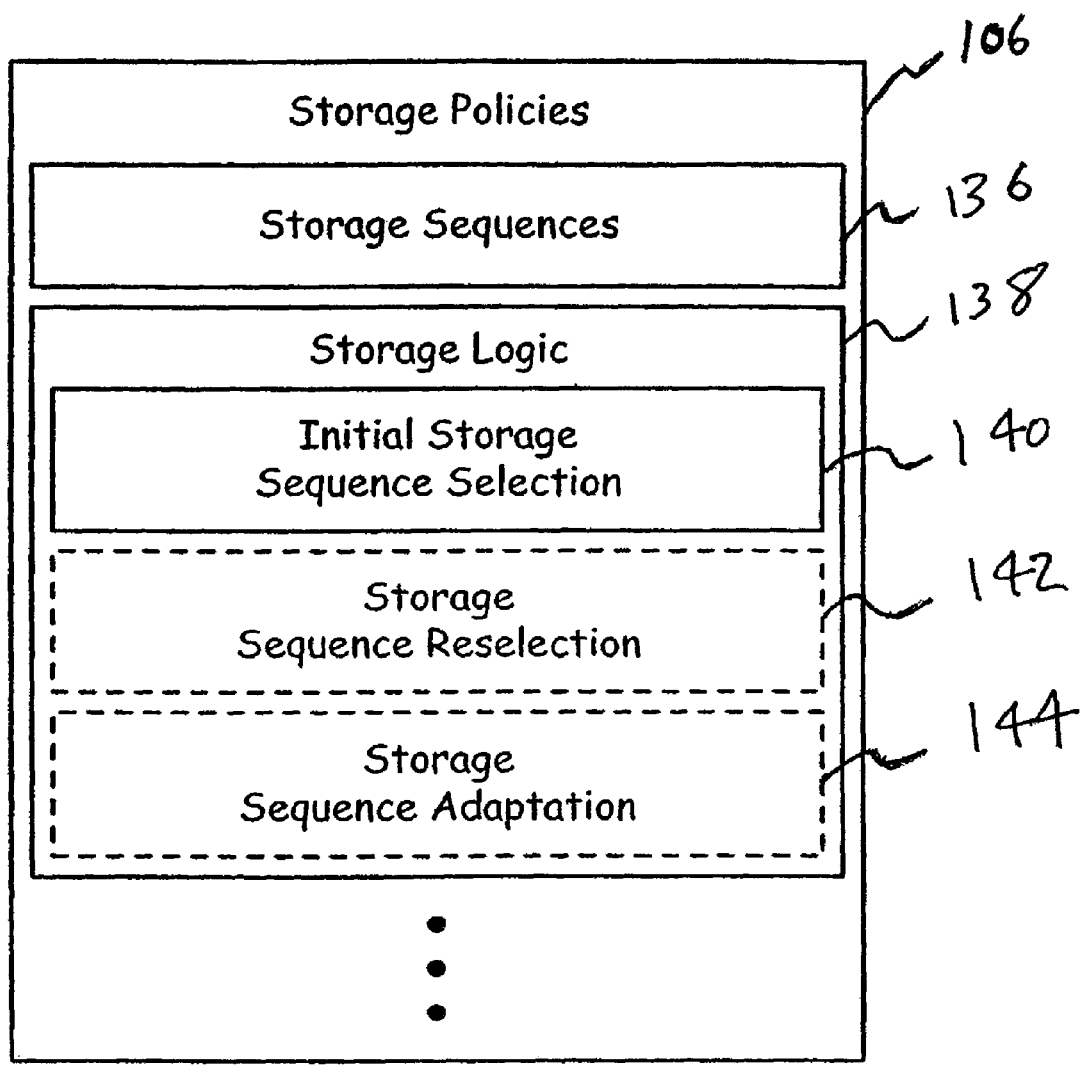
FIG. 3 is a block diagram of exemplary storage policies according to an embodiment of the invention.

FIG. 3 is a block diagram of exemplary data-specific storage policies 106 more fully described in application Ser. No. 09/744,268 which is hereby incorporated herein by reference in its entirety. The storage policies 106 include storage sequences 136 and storage logic 138. The storage sequences 136 represent potential storage patterns which may be used to store particular types of data. The storage logic 138 includes an initial storage sequence selection 140, which represents potential storage considerations for the data when it arrives at the storage control 104. Represented in dash lines is storage sequence reselection 142 and storage sequence adaptation 144. The storage sequence reselection 142 represents logic which would allow alternative sequence selection logic to be used in place of the initial storage sequence selection 140. Although not required, a storage sequence reselection 142 would occur, for example, when the initial storage sequence selection 140 is inappropriate for the data that is being transmitted from the software application 102, such as when the primary backup data set is unavailable or has insufficient storage space for the data. The storage sequence adaptation 144 represents logic that enables the initial storage sequence selection 140 to be modified according to changes in the data that is being saved in the storage mechanisms, for example if the file type changes or other changes occur. As further described herein, data-specific preferences and information can be associated with storage sequences 136, storage logic 138, initial storage sequence selections 140, storage sequence reselections 142, and storage sequence adaptations 144 to process different kinds of data associated with storage policies 106. For example, Microsoft Exchange data can thus be distinguished from Oracle database data and processed differently.

Figure 4:
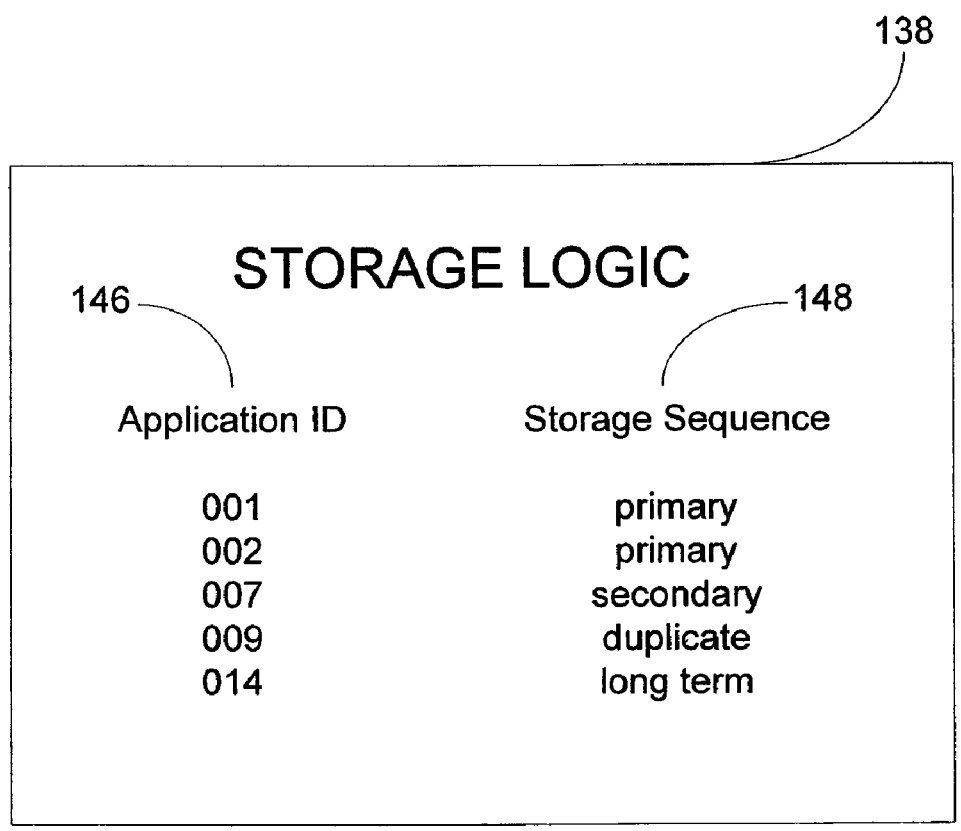
FIG. 4 is a block diagram of exemplary storage logic according to an embodiment of the invention.

FIG. 4 is a block diagram of exemplary storage logic 138 according to one embodiment of the invention. As shown, the storage logic represents a data structure using rows and columns to indicate data-specific IDs 146 that are associated with storage sequence preferences 148. Data-specific IDs 146 are associated with particular types of data such as applications, file types, and other data types known in the art. In some embodiments, data-specific IDs 146 are used as applications IDs to distinguish different types of application data. The left column depicts a plurality of exemplary data-specific IDs 146 corresponding to applications programs such as, for example, Microsoft Exchange, Oracle Corporation Oracle database, Microsoft SQL Server, and other applications known in the art. The right column associates a corresponding storage sequence preference 148 with each data-specific ID 146. For example, the first and second data-specific IDs 146 are associated with a primary storage sequence. Thus, the manager module 124 and other modules consulting the storage logic 138 are able to determine that application data generated by the applications corresponding to the first and second data-specific IDs 146 should be stored according to storage patterns specified in the primary storage sequence as further described herein. Similarly, application data generated by the application corresponding to the third data-specific ID 146 should be stored according to storage patterns specified in a secondary storage sequence. Other data-specific IDs 146 reference storage patterns specified in a duplicate storage sequence and a long term storage sequence.

FIG. 5 is a block diagram of exemplary storage sequences 136 according to one embodiment of the invention. The storage sequences 136 include a primary storage sequence 150, a secondary storage sequence 152, a duplicate storage sequence 154, and a long term storage sequence 156. Those skilled in the art will recognize that these are exemplary storage sequences only, and numerous other storage sequences could be added to the storage sequences 136. The storage sequences 136 are arranged in rows with columns to illustrate different storage sequence characteristics.

For example, the far left column illustrates the storage sequence name followed by a first storage ID in the second column. When applications 102 direct the storage of data, the storage control 104 consults the storage policies 106 to determine an appropriate storage sequence 136 to use for storing the data according to the data-specific ID 146 of the application generating the data. A default storage policy may, for example, include storing the data according to the primary storage sequence 150 where the data would enter the first storage having an ID of 001. The data would be stored at the first storage ID for 13 weeks as indicated in the next column of the storage sequences 136. At this point the data would be moved to a second storage ID 005 where it would be stored for a duration of 26 weeks. After 26 weeks, the data would be moved to a third storage ID 002 for a duration of 52 weeks. This process would continue until the data is stored in an Nth storage ID 004. The primary storage sequence 150, of course, is an exemplary storage sequence, but is explained here as a means to understanding operations of the storage sequences 136. As can be seen from FIG. 5, the other storage sequences operate in a similar manner.

Figure 6:
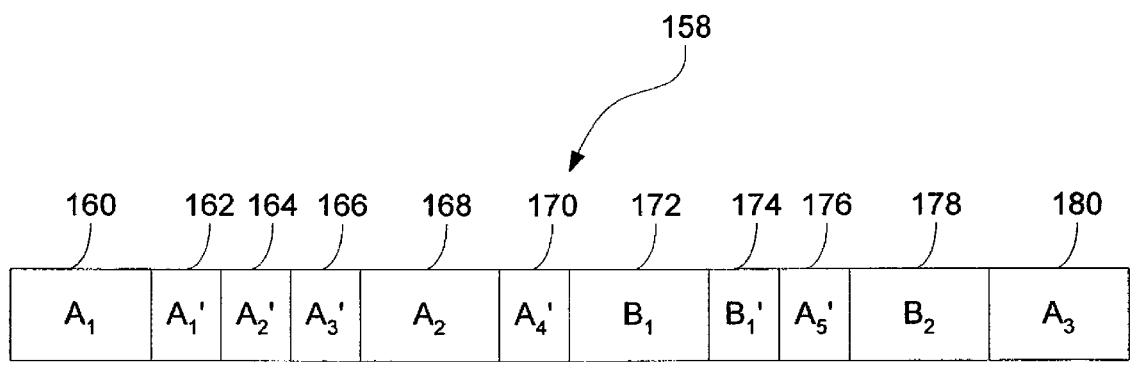
FIG. 6 is a block diagram of an exemplary primary backup data set according to an embodiment of the invention.

FIG. 6 shows an example of a primary backup data set 158 according to one embodiment of the present invention. As shown, the primary backup data set 158 is a block of memory or other storage space and includes full backups $A_1$ 160, $A_2$ 168, $B_1$ 172, $B_2$ 178, and $A_3$ 180, and incremental backups $A'_1$ 162, $A'_2$ 164, $A'_3$ 166, $A'_4$ 170, $B'_1$ 174, and $A'_5$ 176. Those skilled in the art will recognize that backup data sets such as the primary backup data set 158 are not limited to storing only these types of backup data and can store many different types of data including differential backups, synthetic backups, snapshots, quick recovery volumes, and other data types known in the art.

As previously described, application data is stored according to storage sequences 136 and associated with the data-specific IDs 146 specified in storage logic 138. Thus, for example, a storage sequence 136 might require that a full backup be performed weekly with incremental backups being performed on a daily basis. Further, multiple data-specific IDs 146 might be associated with the same storage sequence, and thus a backup data set might contain numerous full backups and incremental backups from one or more different applications. For example, the primary backup data set 158 contains four full backups $A_1$ 160, $A_2$ 168, $B_1$ 172, $B_2$ 178, and $A_3$ 180, and 6 incremental backups $A'_1$ 162, $A'_2$ 164, $A'_3$ 166, $A'_4$ 170, $B'_1$ 174, and $A'_5$ 176.

Each full backup, incremental backup, and other chunk of data stored on a backup data set has a number of characteristics associated with it such as a data-specific ID 146 for the application generating the data, a date the data was stored, the amount of data stored, and other characteristics known in the art which are useful in identifying data. Among other things, these characteristics can be used, as further described herein, to identify discrete individual chunks of data within a backup data set and to perform selective data replication by copying the individual chunks from the backup data set to another backup data set using auxiliary copy and other copying methods known in the art.

Figure 7:
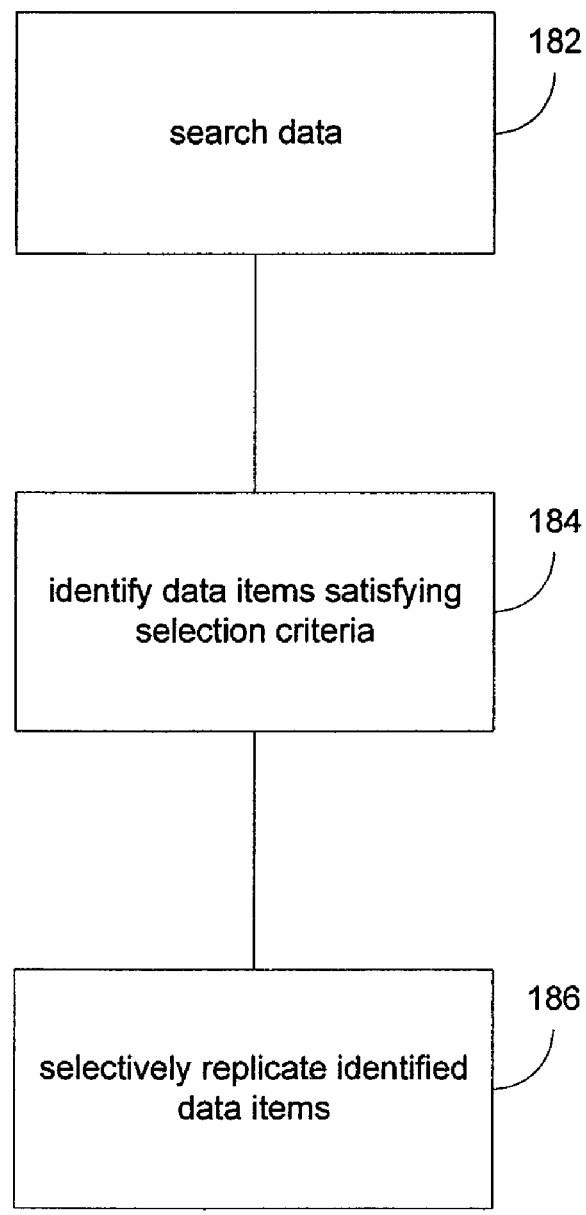
FIG. 7 is a flow chart of a selective data replication process according to an embodiment of the invention.

FIG. 7 is a flow chart depicting a selective data replication process in accordance with one embodiment of the invention. The manager module 124 or other controller program first searches data associated with a first backup data set, step 182. Data contained in the first backup data set can be searched directly or the search can be performed on index data and on other data associated with data in the first backup data set. The manager module 124 identifies data items satisfying selection criteria specified by a user or according to preferences associated with a second backup data set, step 184. For example, preferences associated with a second backup data set to which data items in the first backup data set will be selectively replicated could be used to identify data items in the first backup data set. Those data items which are identified as satisfying the selection criteria are selectively replicated to the second backup data set, step 186.

Figure 8:
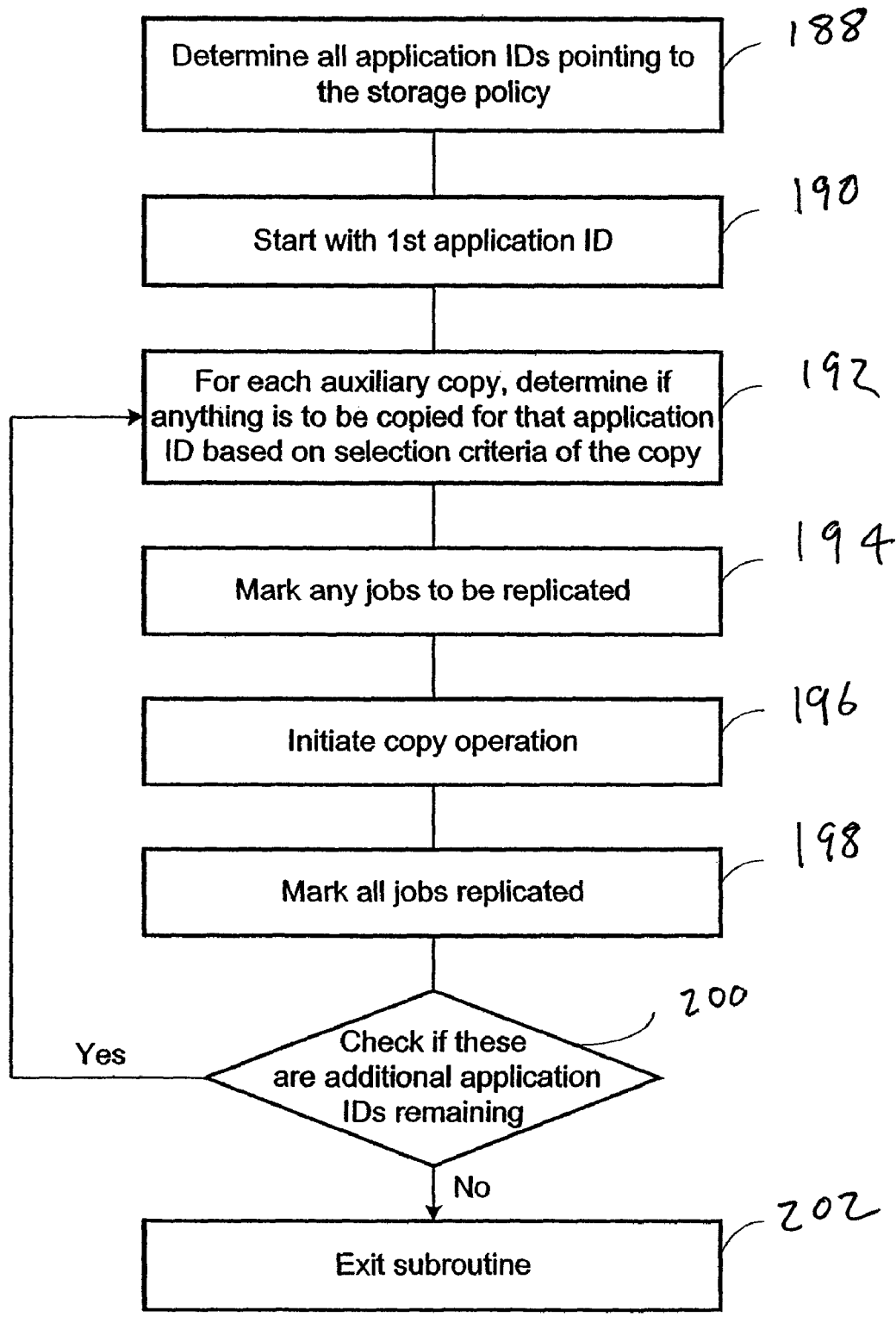
FIG. 8 is a flow chart of another selective data replication process according to an embodiment of the invention.

FIG. 8 is a flow chart depicting another selective data replication process in accordance with one embodiment of the invention. The manager module 124 or other controller program first consults the master map 126 and determines all data-specific IDs 146 pointing to the storage policy 106 for which selective data replication is to be performed, step 188. In some embodiments, the data-specifics IDs may be stored in the data index 130 of the media module 128 or in the storage policies 106. For example, if a user wishes to perform selective data replication for a primary backup data set, the manager module 124 would perform a lookup in the master map 126 to determine which data-specific IDs 146 are associated with the storage policy 106 for the primary backup data set.

Starting with the first data-specific ID 146, step 190, the manager module 124 reviews the data stored on each backup data set to determine whether anything is to be copied for that data-specific ID 146 based on selection criteria of the auxiliary backup data set to which the data to be copied, step 192. For example, an auxiliary backup data set might specify that data for a particular application, such as Microsoft Exchange data, is to be selectively copied from the primary backup data set according to certain selection criteria.

Each auxiliary backup data set has a selection criteria used to decide when to copy which full backup to it. Selection criteria used in selective data replication can be defined either in time or in cycles. Time criteria, for example, can be specified as a given day of the month and every n months and the starting month or also a given day of the week and every n weeks and a starting day of the week. Day of the month in the previous example could take the form of last day of the month. In the case of cycle criteria, a cycle represents the data stored between full backups. For example, a cycle might include a first full backup F1, incremental backups I1, I2, I3, I4, I5, I6, and a second full backup F2. For example, in some embodiments, an application manager keeps track of the cycle number for full backups on a data-specific ID 146 basis. For example, this enables backups to be pruned with smaller retention on the primary backup data set which does not leave any traces to determine the number of cycles between the existing full backups and the full backup copied to an auxiliary backup data set. Those skilled in the art will recognize that many other selection criteria could be used to perform selective data replication.

The manager module 124 then marks or otherwise flags in the master map 126 those jobs that satisfy the selection criteria as jobs to be replicated, step 194. Marking these jobs as such ensures that they will not be pruned before replication can be completed. Often, backup data sets are pruned to promote more efficient tape usage and data storage generally. For example, a storage administrator or a pruning program might prune all backups in a backup data set older than a certain date or according to other useful pruning selection criteria known in the art. When a pruning program searches for data to prune in a backup data set, it first checks to see if data items satisfying the pruning selection criteria are marked to be selectively replicated. If a data item so marked, then a pruning program will not copy the data item until the data item has been selectively replicated and unmarked accordingly as further described herein.

Unlike synchronous data replication where data is replicated archive file by archive file, and thus all backups, incremental backups, differential backups, and other backups are copied to the auxiliary backup data set, with selective data replication the manager module 124 initiates the copy operation on a job-by-job basis to all the necessary backup data sets, step 196, and copies only those full backups satisfying the retention criteria. In some embodiments, this auxiliary copy operation is restart-able since otherwise, the user may not know to restart the operation on the storage policy 106 and still may, for example, have data loss or tapes not being freed due to auxiliary copy failures.

Once the selective data replication of a particular job is complete, the manager module 124 unmarks that job indicating that the data has been successfully copied, step 198, and that job may now be pruned or otherwise manipulated. In some embodiments, the manager module 124 compensates for the same job being replicated to multiple backup data sets by reflecting this status using a matrix data structure or other technique suitable for tracking multiple items and operations in order that jobs may not be pruned before replication to all backup data sets is complete. The manager module 124 checks if there are remaining data-specific IDs 146, step 200, and either returns to step 192 or exits the subroutine, step 202, if there are not.

A time-based example illustrating the process described in FIG. 7 is as follows. Based upon the selection criteria used in step 192, the manager module 124 determines whether it is time to locate a full backup in the recent past to copy. If a backup is found to be copied, the manager module 124 marks the job to be replicated and the job cannot be pruned. The manager module 124 adds the job ID to the list of jobs that need to be replicated to the particular backup data set. This may be a matrix since the same job may have to be copied to multiple backup data sets.

For example, if the selection criterion is given to be a given day of the month every n month, the manager module 124 will copy the most recent successful full backup from the time selective copy was configured, that happened to the primary backup data set. The manager module 124 copies the first full backup to all the backup data sets irrespective of the criterion. After the first backup is copied, the manager module 124 will try to find the most recent successful full backup as of the given day of the month starting from the current time searching backwards in time and copies that full backup. In some embodiments, if the full backup found is same as the full backup which was already copied, the manager module 124 will issue a critical event and an alert.

A cycle-based example illustrating the process described in FIG. 7 is as follows. Based on the selection criteria used in step 192, the manager module 124 determines the previous full backup cycle number for the data-specific ID 146 in question. If the difference between the replicated cycle and the data-specific ID 146 in question is equal to the number of cycles in the criterion, the manager module 124 marks the job to be replicated and the job cannot be pruned. As previously described, this may employ a matrix or other technique, since the same job may have to be copied to multiple backup data sets.

For example, if the selection criterion is given in cycles as 4 cycles, the manager module 124 will copy the first full backup that happens to the primary backup data set. The manager module 124 records the cycle number for this full backup. The manager module 124 will then try to find the fourth successful full backup going backward in time. If one exists, then that full backup is also copied.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A non-transitory computer-readable memory storing instructions, which, when executed by a computer, perform a method for copying data stored in a first copy data set, the method comprising:

identifying, in the first copy data set, a data item satisfying a selection criterion based at least in part on a data-specific ID,
wherein the data-specific ID is associated with a software application for the data item or is associated with a file type for the data item; and copying to a second copy data set at least a portion of the data item,
    wherein the copying is based on one of at least two differing storage preferences, and wherein the one storage preference is based on the data-specific ID,
indicating that the data item satisfies the selection criteria,
    wherein the data item indicated is de-indicated after the data item is copied to the second copy data set, and
    wherein the data item indicated will not be pruned by a pruning program unless the data item is first de-indicated.

2. The computer-readable memory of claim 1, wherein identifying the data item comprises identifying a full copy within a primary copy data set of application data or within an auxiliary copy data set of application data.

3. The computer-readable memory of claim 1 wherein the selection criterion further comprises a time criterion, wherein identifying the data item satisfying the selection criterion comprises comparing a time the data item was stored to the time criterion, wherein the time criterion comprises a day of a week for a day of a month, and wherein identifying the data item satisfying the selection criterion comprises comparing a day of the week the data item was stored to the day of the week or to the day of the month.

4. The computer-readable memory of claim 1, wherein the selection criterion further comprises a time criterion and wherein identifying the data item satisfying the selection criterion comprises comparing a time the data item was stored to the time criterion.

5. The computer-readable memory of claim 1, wherein the selection criterion further comprises a cycle criterion and wherein identifying the data item satisfying the selection criterion comprises comparing a number of cycles occurring since the data item was stored to the cycle criterion, and wherein the cycle criterion comprises a number of full copies performed and wherein identifying the data item satisfying the selection criterion comprises comparing a number of full copies performed since the data item was stored to the number of full copies.

6. The computer-readable memory of claim 1, wherein the selection criterion further comprises a cycle criterion and wherein identifying the data item satisfying the selection criterion comprises comparing a number of cycles occurring since the data item was stored to the cycle criterion.

7. The computer-readable memory of claim 1, further comprising indicating that the data item satisfies the selection criteria, wherein indicating that the data item satisfies the selection criterion comprises associating, in a matrix, information with the data item indicating that the data item satisfies the selection criterion.

8. The computer-readable memory of claim 1, further comprising indicating that the data item satisfies the selection criteria, wherein indicating that the data item satisfies the selection criterion comprises associating, in a data structure, information with the data item indicating that the data item satisfies the selection criterion.

9. The computer-readable memory of claim 1, further comprising indicating that the data item satisfies the selection criteria, wherein the data item indicated is de-indicated after the data item is copied to the second copy data set, and wherein de-indicating the data item comprises removing, in a data structure, information associated with the data item indicating that the data item satisfies the selection criterion.

10. The computer-readable memory of claim 1, further comprising indicating that the data item satisfies the selection criteria, wherein the data item indicated is de-indicated after the data item is copied to the second copy data set.

11. The computer-readable memory of claim 1, further comprising indicating that the data item satisfies the selection criteria.

12. The computer-readable memory of claim 1, wherein the data item comprises a full copy of application data.

13. The computer-readable memory of claim 1, wherein copying at least a portion of the data item comprises performing an auxiliary copy of at least a portion of the data item.

14. The computer-readable memory of claim 1, wherein the copying of at least a portion of the data item is a restartable operation.

15. A system for copying electronic data, the system comprising:
    storage means for storing at least
        a first copy data set containing one or more data items;
        a second copy data set; and
    data processing means, coupled to the storage means, for identifying, in the first copy data set, a first data item satisfying a selection criteria based at least in part on a data-specific ID,
        wherein the data-specific ID is associated with a software application for the data item or is associated with a file type for the data item; and
    wherein the data processing means includes means for copying at least a portion of the first data item from the first copy data set to the second copy data set,
        wherein the copying is based on one of at least two differing storage preferences, and wherein the one storage preference is based on the data-specific ID, and
    wherein the data processing means further comprises means for marking that the data item satisfies the selection criteria;
        wherein the data item indicated is unmarked after the data item is copied to the second copy data set, and
        wherein the data item indicated will not be pruned unless the data item is first unmarked.

16. A method for copying electronic data stored in a first copy data set, the method comprising:
    identifying, in the first copy data set, a data item satisfying a selection criterion based at least in part on a data-specific ID,
        wherein the data-specific ID is associated with a software application for the data item or is associated with a file type for the data item; and
    copying to a second copy data set at least a portion of the data item, and
        wherein the copying is based on one of at least two differing storage preferences, and wherein the one storage preference is based on the data-specific ID,
    indicating that the data item satisfies the selection criteria,
        wherein the data item is no longer indicated after the data item is copied to the second copy data set, and
        wherein the data item indicated will not be pruned unless the data item is no longer indicated.

17. The method of claim 16, wherein identifying the data item comprises identifying a full copy within a primary copy data set of application data or within an auxiliary copy data set of application data.

18. The method of claim 16, wherein the selection criterion further comprises a time criterion and wherein identifying the data item satisfying the selection criterion comprises comparing a time the data item was stored to the time criterion.

* * * * *

UNITED STATES PATENT AND TRADEMARK OFFICE
CERTIFICATE OF CORRECTION

PATENT NO.       : 8,161,003 B2                       Page 1 of 1
APPLICATION NO.  : 12/403159
DATED            : April 17, 2012
INVENTOR(S)      : Srinivas Kavuri et al.

It is certified that error appears in the above-identified patent and that said Letters Patent is hereby corrected as shown below:

In column 1, line 63, delete "Comm Vault Systems," and insert -- CommVault Systems, --, therefor.

In column 12, line 34, in claim 15, delete "criteria;" and insert -- criteria, --, therefor.

Signed and Sealed this
Nineteenth Day of June, 2012

David J. Kappos
*Director of the United States Patent and Trademark Office*